United States Patent
Shukla

(10) Patent No.: US 11,671,367 B1
(45) Date of Patent: *Jun. 6, 2023

(54) METHODS AND APPARATUS FOR IMPROVING LOAD BALANCING IN OVERLAY NETWORKS

(71) Applicant: Juniper Networks, Inc., Sunnyvale, CA (US)

(72) Inventor: Amit Shukla, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,749

(22) Filed: Jul. 1, 2020

Related U.S. Application Data

(63) Continuation of application No. 15/443,979, filed on Feb. 27, 2017, now abandoned, which is a continuation of application No. 13/225,137, filed on Sep. 2, 2011, now Pat. No. 9,590,820.

(51) Int. Cl.
*H04L 47/10* (2022.01)
*H04L 12/46* (2006.01)

(52) U.S. Cl.
CPC .......... *H04L 47/10* (2013.01); *H04L 12/4633* (2013.01)

(58) Field of Classification Search
CPC ............................. H04L 47/10; H04L 12/4633
See application file for complete search history.

(56) References Cited

U.S. PATENT DOCUMENTS

| | | | |
|---|---|---|---|
| 6,804,767 | B1 | 10/2004 | Melvin |
| 6,965,599 | B1 | 11/2005 | Sakurai et al. |
| 7,027,404 | B2 | 4/2006 | Sreejith et al. |
| 7,061,927 | B2 | 6/2006 | Panigrahy et al. |
| 7,072,348 | B2 | 7/2006 | Frank |
| 7,339,935 | B2 | 3/2008 | Yasukawa et al. |
| 7,697,432 | B2 | 4/2010 | Yu et al. |
| 7,724,760 | B2 | 5/2010 | Balakrishnan et al. |

(Continued)

OTHER PUBLICATIONS

Mir, N. F., "An Efficient Switching System for Next-Generation Large-Scale Computer Networking," San Jose State University, Department of Electrical Engineering, Proceedings of IEEE ICCS'02 Conference, 2002, pp. 1130-1134.

(Continued)

*Primary Examiner* — Chirag G Shah
*Assistant Examiner* — Joshua Smith
(74) *Attorney, Agent, or Firm* — Cooley LLP

(57) ABSTRACT

An apparatus includes a virtual switch hosted at a first network device. The virtual switch is configured to receive a data packet from a first virtual resource hosted at the first network device to be sent to a second virtual resource hosted at a second network device. The virtual switch is configured to encapsulate the data packet to define an encapsulated data packet using a tunnel header, which has a first portion associated with the first and second network devices, and a second portion associated with a data flow between the first and second virtual resources when the data packet is sent from the first network device to the second network device. An Internet Protocol network can use the second portion of the tunnel header to load balance the data packet with respect to other data packets sent from the first network device to the second network device.

20 Claims, 5 Drawing Sheets

(56) References Cited

U.S. PATENT DOCUMENTS

| | | | |
|---|---|---|---|
| 8,443,077 | B1 | 5/2013 | Lappas et al. |
| 9,172,645 | B1 | 10/2015 | Aybay |
| 9,331,929 | B1 | 5/2016 | Thomas et al. |
| 9,590,820 | B1 | 3/2017 | Shukla |
| 2002/0064170 | A1 | 5/2002 | Siu et al. |
| 2003/0076825 | A1 | 4/2003 | Guruprasad |
| 2004/0174865 | A1 | 9/2004 | O'Neill |
| 2004/0219909 | A1 | 11/2004 | Kennedy et al. |
| 2005/0008041 | A1 | 1/2005 | Wu |
| 2005/0060414 | A1 | 3/2005 | Phillips et al. |
| 2005/0195834 | A1 | 9/2005 | Kikuchi |
| 2007/0280243 | A1* | 12/2007 | Wray ............... H04L 12/4633 370/392 |
| 2008/0101315 | A1 | 5/2008 | Bachmutsky |
| 2008/0228865 | A1 | 9/2008 | Cruzada |
| 2008/0244016 | A1 | 10/2008 | Parthasarathy et al. |
| 2009/0003212 | A1 | 1/2009 | Kwan et al. |
| 2009/0201811 | A1 | 8/2009 | Filsfils et al. |
| 2009/0257450 | A1 | 10/2009 | Sirigiri |
| 2010/0142548 | A1 | 6/2010 | Sheth |
| 2010/0146082 | A1 | 6/2010 | Isobe |
| 2010/0195535 | A1 | 8/2010 | Ziller et al. |
| 2010/0214913 | A1 | 8/2010 | Kompella |
| 2010/0284404 | A1* | 11/2010 | Gopinath ............... H04L 49/90 370/392 |
| 2011/0063979 | A1 | 3/2011 | Matthews et al. |
| 2011/0030815 | A1 | 4/2011 | Gundavelli et al. |
| 2011/0179136 | A1 | 7/2011 | Twitchell |
| 2011/0191624 | A1 | 8/2011 | Rodgers et al. |
| 2011/0246627 | A1 | 10/2011 | Kern |
| 2011/0268133 | A1 | 11/2011 | Cucchi |
| 2011/0283013 | A1 | 11/2011 | Grosser et al. |
| 2012/0014387 | A1 | 1/2012 | Dunbar et al. |
| 2012/0033673 | A1* | 2/2012 | Goel ............... H04L 49/70 370/400 |
| 2012/0089980 | A1 | 4/2012 | Sharp et al. |
| 2012/0099602 | A1 | 4/2012 | Nagapudi et al. |
| 2012/0110393 | A1 | 5/2012 | Shieh et al. |
| 2012/0158997 | A1* | 6/2012 | Hsu ............... H04L 45/66 709/242 |
| 2012/0182992 | A1 | 7/2012 | Cowart et al. |
| 2012/0324112 | A1 | 12/2012 | Dow et al. |
| 2013/0058250 | A1* | 3/2013 | Casado ............... H04L 41/0816 370/254 |

OTHER PUBLICATIONS

Jung, Y. C. et al., "Banyan Multipath Self-Routing ATM Switches with Shared Buffer Type Switch Elements," IEEE Transactions on Communications, vol. 43, No. 11, Nov. 1995, pp. 2847-2857.

Xia, Y. et al., "Multiple-Choice Random Network for Server Load Balancing," [online] Retrieved from the Internet: , INFOCOM 2007, 26th International Conference on Computer Communications, IEEE, 9 pages.

Raiciu, C., "Data Center Networking with Multipath TCP," Slideshow, University College London & Universitatea Politehnica Bucuresti, [online] [retrieved Jan. 2011] Retrieved from the Internet: <URL: http://www.ietf.org/proceedings/79/slides/mptcp-6.ppt>, 28 pages.

Kompella, K. et al. "The Use of Entropy Labels in MPLS Forwarding," Mar. 6, 2011, 25 pages.

Office Action for U.S. Appl. No. 12/953,149, dated Jan. 3, 2013, 13 pages.

* cited by examiner

METHODS AND APPARATUS FOR IMPROVING LOAD BALANCING IN OVERLAY NETWORKS

CROSS REFERENCE TO RELATED APPLICATIONS

This application is a continuation of U.S. patent application Ser. No. 15/443,979, filed Feb. 27, 2017, which is a continuation of U.S. patent application Ser. No. 13/225,137 filed Sep. 2, 2011, entitled "Methods and Apparatus for Improving Load Balancing in Overlay Networks" (U.S. Pat. No. 9,590,820), the contents of which are incorporated herein by reference.

BACKGROUND

Some embodiments described herein relate generally to overlay networks, and, in particular, to methods and apparatus for improving load balancing in an overlay network.

In some known overlay networks, data packets are encapsulated before being tunneled from a source device to a destination device. The encapsulated packet headers typically include only information associated with the source device and the destination device, which is common across all encapsulated packets between the same pair of a source device and a destination device. Therefore, such encapsulated packet headers are typically not used for load balancing at a switching or routing device. Such a problem is further aggravated in a virtualization environment for some known overlay networks, where a source device tunnels all the traffic originated from local virtual machines and hides the source and destination virtual machine identification information from the tunneled packet headers. As a result, traffic originated from different virtual machines of a common source device and destined to different virtual machines of a common destination device is typically sent via a same path.

Accordingly, a need exists for tunneling methods and apparatus that can achieve a better load balancing in overlay networks.

SUMMARY

An apparatus includes a virtual switch hosted at a first network device. The virtual switch is configured to receive a data packet from a first virtual resource hosted at the first network device to be sent to a second virtual resource hosted at a second network device. The virtual switch is configured to encapsulate the data packet to define an encapsulated data packet using a tunnel header, which has a first portion associated with the first and second network devices, and a second portion associated with a data flow between the first and second virtual resources when the data packet is sent from the first network device to the second network device. An Internet Protocol network can use the second portion of the tunnel header to load balance the data packet with respect to other data packets sent from the first network device to the second network device.

DETAILED DESCRIPTION

Figure 1:
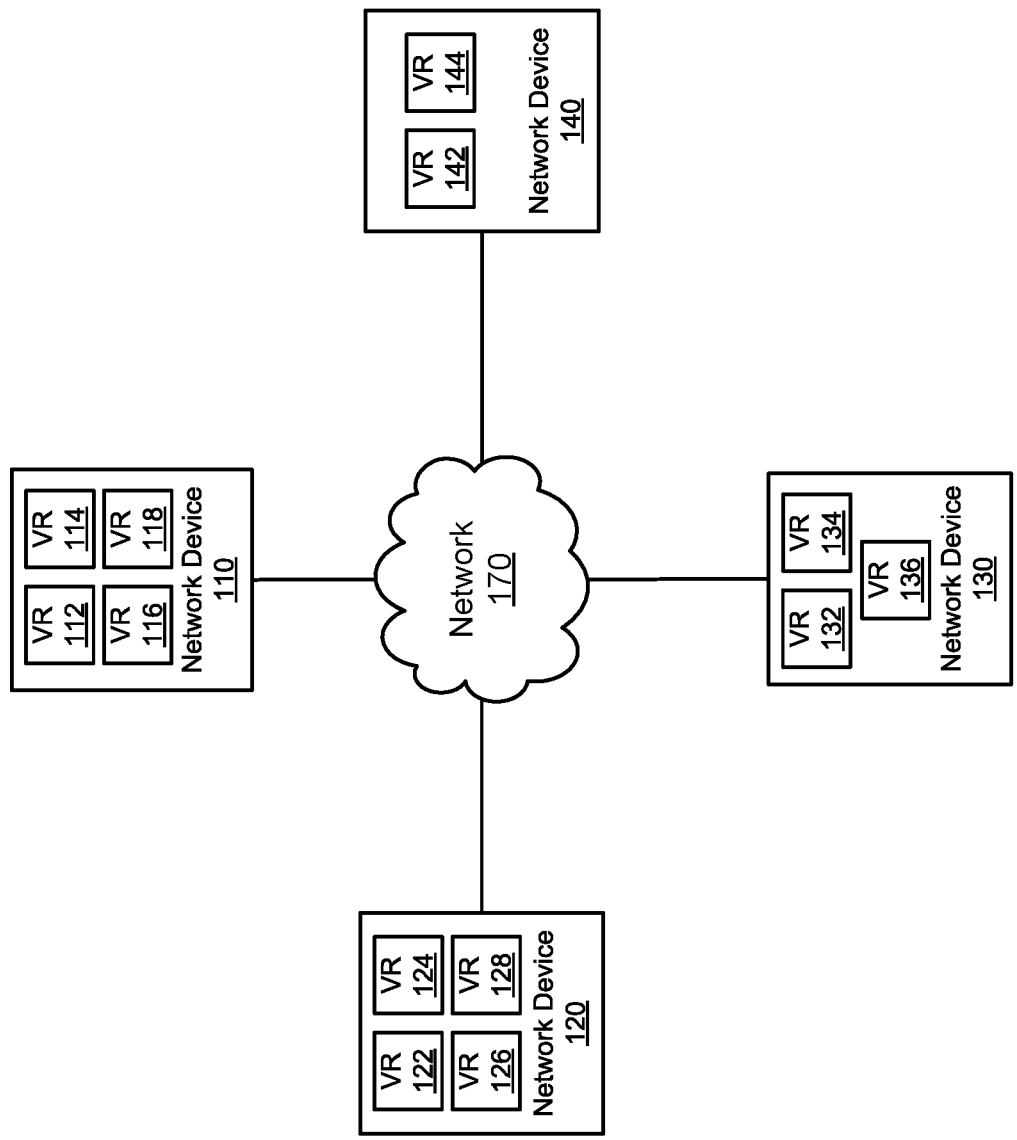
FIG. 1 is a schematic illustration of multiple network devices configured to be coupled to each other via a network, according to an embodiment.

In some embodiments, an apparatus includes a virtual switch configured to be hosted at a first network device. The virtual switch is configured to receive a data packet from a first virtual resource hosted at the first network device. The data packet is to be sent to a second virtual resource hosted at a second network device. The data packet includes a header portion associated with the first virtual resource and the second virtual resource. The virtual switch is configured to encapsulate the data packet to define an encapsulated data packet using a tunnel header. The tunnel header has (1) a first portion associated with the first network device and the second network device, and (2) a second portion associated with a data flow between the first virtual resource and the second virtual resource when the data packet is sent from the first network device to the second network device. Furthermore, the virtual switch is configured to send the encapsulated data packet to an Internet Protocol (IP) network such that the IP network can use the tunnel header to route the data packet to the second network device. Particularly, the IP network uses the second portion of the tunnel header to load balance the data packet with respect to other data packets sent from the first network device to the second network device.

In some embodiments, the first portion of the tunnel header includes a Media Access Control (MAC) address and an IP address of the second network device. In some embodiments, the second portion of the tunnel header is a User Datagram Protocol (UDP) header having a source port portion that includes an identifier associated with the data flow between the first virtual resource and the second virtual resource. Additionally, a value associated with the second portion of the tunnel header is an output of a hash function using an IP address associated with the first virtual resource and an IP address associated with the second virtual resource as inputs of the hash function.

In some embodiments, the virtual switch is configured to receive a second data packet from a third virtual resource hosted at the first network device, where the second data packet is to be sent to a fourth virtual resource hosted at the second network device. The virtual switch is configured to encapsulate the second data packet to define a second encapsulated data packet using a second tunnel header. The second tunnel header has (1) a first portion associated with the first network device and the second network device, and (2) a second portion associated with a data flow between the third virtual resource and the fourth virtual resource when the second data packet is sent from the first network device to the second network device. As a result, the IP network can send the second encapsulated data packet to the second network device via a first path and the first encapsulated data packet to the second network device via a second path different than the first path.

In some embodiments, an apparatus hosted at a first network device includes a first virtual resource, a second virtual resource and a virtual switch. The first virtual resource is configured to define a first data packet to be sent to a third virtual resource configured to be hosted at a second network device. The first data packet includes a header portion associated with the first virtual resource and the third virtual resource. The second virtual resource is configured to define a second data packet to be sent to a fourth virtual resource configured to be hosted at the second network device. The virtual switch is configured to receive the first data packet from the first virtual resource and the second data packet from the second virtual resource. The virtual switch is configured to encapsulate the first data packet to define a first encapsulated data packet using a first tunnel header, which includes a transport protocol portion having a source port value associated with a flow of data from the first virtual resource to the third virtual resource. The virtual switch is also configured to encapsulate the second data packet to define a second encapsulated data packet using a second tunnel header, which includes a transport protocol portion having a source port value associated with a flow of data from the second virtual resource to the fourth virtual resource. In some embodiments, the transport protocol portion of the first tunnel header is one of a UDP portion or a Transport Control Protocol (TCP) portion. In some embodiments, the virtual switch is configured to define a value of the transport protocol portion of the first tunnel header based on an output of a hash function using an IP address associated with the first virtual resource as an input of the hash function.

The virtual switch is configured to send the first encapsulated data packet to the second network device such that the first encapsulated data packet is routed to the second network device via a first data path based on the first tunnel header. The virtual switch is also configured to send the second encapsulated data packet to the second network device such that the second encapsulated data packet is routed to the second network device via a second data path different than the first data path based on the second tunnel header. In some embodiments, the virtual switch is configured to send the first encapsulated data packet and the second encapsulated data packet to the second network device via an IP network.

FIG. 1 is a schematic illustration of multiple network devices 110, 120, 130 and 140 configured to be coupled to each other via a network 170, according to an embodiment. Network 170 can be any type of network that can be connected to one or more network devices and enable data transmissions among the connected network devices. For example, network 170 can be a data center network, a WAN (wireless area network), a LAN (local area network), the Internet, etc., or a combination of such networks.

Network device 110, 120, 130 or 140 can be any type of device that can be connected to network 170, and send data to and/or receive data from other network devices 110, 120, 130 140 via network 170. Network devices 110, 120, 130 and 140 can be, for example, compute nodes, storage devices, servers, gateways, workstations, and/or the like. Each network device 110, 120, 130 or 140 can be coupled to network 170 using any suitable connection such as, for example, an optical connection (e.g., an optical cable and optical connectors), an electrical connection (e.g., an electrical cable and electrical connectors), a wireless connection (e.g., a wireless transceiver and a wireless access point) and/or the like. As such, network devices 110, 120, 130 and 140 can be operatively coupled to other network devices, and thus configured to send data (e.g., data packets) to and/or receive data from other network device, via network 170.

Specifically, network devices 110, 120, 130 and 140 can include one or more network interface components (e.g., a 40 Gigabit (Gb) Ethernet interface, a 100 Gb Ethernet interface, etc.) through which those network devices can send signals to and/or receive signals from network 170. The signals can be sent to and/or received from network 170 via an optical link, an electrical link, and/or a wireless link operatively coupled to those network devices. In some embodiments, network devices 110, 120, 130 and 140 can be configured to send signals to and/or receive signals from network 170 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

A network device coupled to network 170 can include one or more virtual resources (VR). As shown in FIG. 1, network device 110 includes virtual resources 112, 114, 116 and 118; network device 120 includes virtual resources 122, 124, 126 and 128; network device 130 includes virtual resources 132, 134 and 136; network device 140 includes virtual resources 142 and 144. Each virtual resource included in a network device can be a combination of a hardware module(s) and/or software (stored and/or executing in a hardware) that can be configured to communicate with other virtual resources and/or modules included in that network device and/or in other network devices. In some embodiments, a virtual resource can be a virtual machine or an application running on a network device hosting the virtual resource.

To communicate with another virtual resource, each virtual resource can be configured to define data packets, send data packets to and/or receive data packets from the other virtual resource. In some embodiments, data packets defined at a first virtual resource included in a first network device can be destined to a second virtual resource included in a second network device. The data packets can be encapsulated at the first network device, and then the encapsulated data packets can be tunneled to the second network device via a tunnel through network 170. After receiving the encapsulated data packets, the second network device can be configured to decapsulate the encapsulated data packets to retrieve the original data packets, and then send the data packets to the second virtual resource.

In some embodiments, a virtual resource included in a network device can function both as a source virtual resource that defines and sends data packets, and as a destination virtual resource that receives data packets. Accordingly, the network device hosting that virtual resource can function both as a source network device that encapsulates data packets received from that virtual resource and sends the encapsulated data packets, and as a destination network device that receives encapsulated data packets and decapsulates the received encapsulated data packets. Details of a virtual resource in a network device communicating with another virtual resource in another network device through an intermediary network are further described with respect to FIGS. 2-8. Additionally, in some embodiments, a virtual resource included in a network device can be configured to send data packets to another virtual resource included in the same network device. In such embodiments, the network device hosting the two virtual resources need not encapsulate or decapsulate the data packets.

Figure 2:
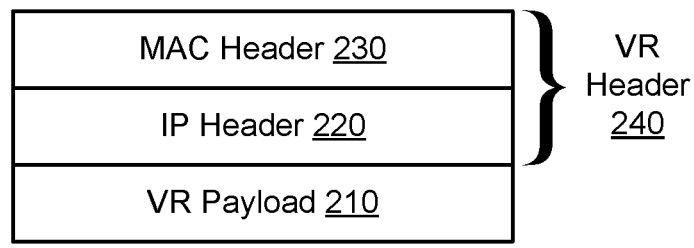
FIG. 2 is a schematic illustration of the structure of a data packet defined at a virtual resource, according to an embodiment.

FIG. 2 is a schematic illustration of the structure of a data packet 200 defined at a virtual resource, according to an embodiment. Specifically, data packet 200 can be defined, at a source virtual resource in a source network device, to be destined to a destination virtual resource in a destination network device (different from the source network device). The source and destination virtual resources can be similar to the virtual resources (e.g., virtual resource 122, 142, etc.) shown in FIG. 1, and the source and destination network devices can be similar to the network devices (e.g., network device 120, 140) shown in FIG. 1.

As shown in FIG. 2, data packet 200 includes a virtual resource header 240, which includes MAC header 230 and IP header 220; and a virtual resource payload 210. Virtual resource payload 210 contains payload data that is intended to be sent from the source virtual resource to the destination virtual resource. Virtual resource header 240 contains information that can be used to route data packet 200 from the source virtual resource to the destination virtual resource. Particularly, virtual resource header 240 contains information that can be used to deliver data packet 200 from the source network device to the destination virtual resource, as described in detail below. Virtual resource header 240 includes MAC header 230 and IP header 220. In some embodiments, MAC header 230 and IP header 220 can contain a MAC address and an IP address of the destination virtual resource, respectively. In some other embodiments, MAC header 230 and IP header 220 can, respectively, contain MAC addresses and IP addresses of both the destination virtual resource and the source virtual resource.

For example, as shown in FIG. 1, when virtual resource 122 included in network device 120 is intended to send data to virtual resource 142 included in network device 140, data packet 200 can be defined at virtual resource 122. Specifically, virtual resource payload 210 can contain the data that is intended to be sent from virtual resource 122 to virtual resource 142; MAC header 230 can contain a MAC address of virtual resource 142 and/or a MAC address of virtual resource 122; IP header 220 can contain an IP address of virtual resource 142 and/or an IP address of virtual resource 122. As such, data packet 200 can be defined and then sent to, for example, another portion of network device 120 for further processing, as described below with respect to FIGS. 3 and 5.

In some embodiments, after data packet 200 is delivered to the destination network device, MAC header 230 and/or IP header 220 included in virtual header 240 can be used to send data packet 200 to the destination virtual resource. Specifically, data packet 200 can be sent to the destination virtual resource by the destination network device based on the MAC address and/or the IP address of the destination virtual resource included in MAC header 230 and/or IP header 220. In the example of FIG. 1, after network device 140 receives data packet 200 that is defined at virtual resource 122 and sent from network device 120 via network 170, network device 140 can determine that data packet 200 is destined to virtual resource 142 based on the MAC address and/or IP address of virtual resource 142 as the destination virtual resource included in MAC header 230 and/or IP header 220 of data packet 200. As a result, data packet 200 can be sent to virtual resource 142.

Figure 3:
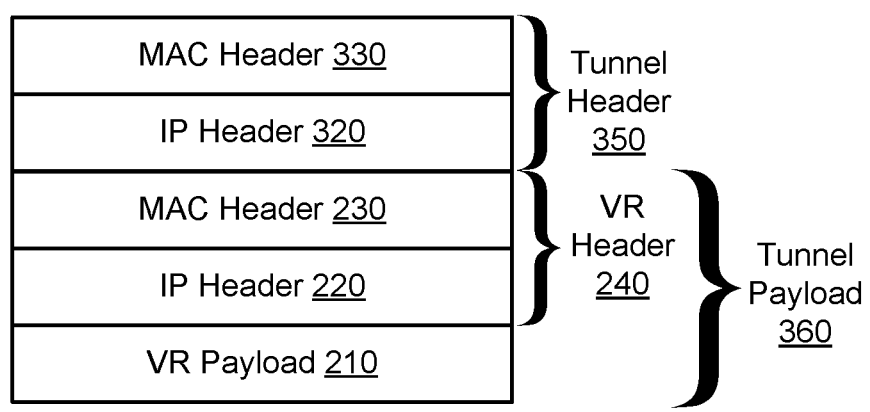
FIG. 3 is a schematic illustration of the structure of an encapsulated data packet defined at a network device.

In some embodiments, a data packet (e.g., data packet 200 shown in FIG. 2) defined at a virtual resource included in a source network device can be encapsulated at the source network device to define an encapsulated data packet, and the encapsulated data packet can be sent from the source network device to a destination network device via a tunnel. FIG. 3 is a schematic illustration of the structure of such an encapsulated data packet 300 defined at a network device. Particularly, encapsulated data packet 300 is defined based on encapsulating data packet 200 shown in FIG. 2. Encapsulated data packet 300 can be defined at the source network device including the source virtual resource, where data packet 200 is defined. Furthermore, encapsulated data packet 300 can be defined to be destined to the destination network device hosting the destination virtual resource, to which data packet 200 is destined. In some embodiments, encapsulated data packet 300 can be defined at a component or a portion, such as a virtual switch (e.g., virtual switch 422 shown in FIG. 4), within the source network device.

As shown in FIG. 3, encapsulated data packet 300 includes a tunnel payload 360, which essentially contains data packet 200; and a tunnel header 350, which includes MAC header 330 and IP header 320. Tunnel payload 360 contains data packet 200 received from the source virtual resource where data packet 200 is defined, including virtual payload 210 and virtual header 240 (including MAC header 230 and IP header 220). Thus, tunnel payload 360 can be considered as the payload of encapsulated data packet 300. Tunnel header 350 contains information that can be used to route encapsulated data packet 300 from the source network device to the destination network device, for example, via a tunnel over a network (e.g., network 170 in FIG. 1). Tunnel header 350 includes MAC header 330 and IP header 320. In some embodiments, MAC header 330 and IP header 320 can contain a MAC address and an IP address of the destination network device, respectively. In some other embodiments, MAC header 330 and IP header 320 can, respectively, contain MAC addresses and IP addresses of both the destination network device and the source network device.

In some embodiments, encapsulated data packet 300 can be defined at the source network device based on information associated with the destination virtual resource and the destination network device that is stored in the source network device. Specifically, after data packet 200 is defined at the source virtual resource and sent to another component (e.g., a virtual switch) of the source network device, the destination virtual resource of data packet 200 can be determined based on information associated with the destination virtual resource, such as the MAC address and/or the IP address of the destination virtual resource, retrieved from virtual resource header 240. Subsequently, the destination network device that includes the destination virtual resource can be determined based on the destination virtual resource and information retrieved from, for example, a table that maps each virtual resource to a network device hosting that virtual resource. The table can be stored in a memory within the source network device and accessible to the component of the source network device that encapsulates data packet 200. As a result, data packet 200 can be encapsulated to define encapsulated data packet 300, which includes information associated with the destination network device in tunnel header 350 (e.g., a MAC address and/or IP address of the destination network device).

Encapsulated data packet 300 can be tunneled from the source network device to the destination network device over a network based on the information associated with the destination network device and/or the source network device included in tunnel header 350. Specifically, a data path for tunneling data packet 300 across the network can be determined based on the MAC addresses and/or IP addresses of the destination network device and/or the source network device included in tunnel header 350. In some scenarios, a common data path is determined for tunneling data packets having the same MAC addresses and/or IP addresses of a common destination device and a common source destination device. Furthermore, information associated with the destination virtual resource and/or the source virtual resource included in data packet 200 (or equivalently, included in encapsulated data packet 300) is not used in determining the data path for tunneling encapsulated data packet 300 from the source network device to the destination network device. As a result, data packets defined at different source virtual resources included in a common source network device and destined to different destination virtual resources included in a common destination network device are tunneled via a common data path from the source network device to the destination network device. In such scenarios, load balancing among those data packets across multiple data paths is typically not achieved.

In the example of FIG. 1, after data packet 200 destined to virtual resource 142 is defined at virtual resource 122, data packet 200 is sent to another component (e.g., a virtual switch) of network device 120 to be encapsulated. Based on information retrieved from a table that maps each virtual resource to a network device hosting that virtual resource, network device 120 is configured to identify network device 140 as the network device that hosts virtual resource 142. Thus, data packet 200 is encapsulated to define encapsulated data packet 300, such that the MAC address of network device 140 is included in MAC header 330 and the IP address of network device 140 is included in IP header 320. Next, encapsulated data packet 300 is tunneled from network device 120 to network device 140 via a data path across network 170, which is determined based on the MAC address and/or IP address of network device 140 included in tunnel header 350. Additionally, the data path for tunneling encapsulated data packet 300 is the same as that for tunneling other encapsulated data packets sent from network device 120 to network device 140 (e.g., a data packet defined at virtual resource 128 and destined to virtual resource 144, etc.). In response to receiving encapsulated data packet 300, network device 140 is configured to decapsulate encapsulated data packet 300, such that tunnel payload 360 (or equivalently, data packet 200) is retrieved from encapsulated data packet 300. Subsequently, network device 140 is configured to send tunnel payload 360 (i.e., data packet 200) to virtual resource 142 based on the MAC address and/or IP address of virtual resource 142 included in virtual header 240 (i.e., MAC header 230 and/or IP header 220). Thus, the data contained in virtual payload 210 is delivered to virtual resource 142 from virtual resource 122.

Figure 4:
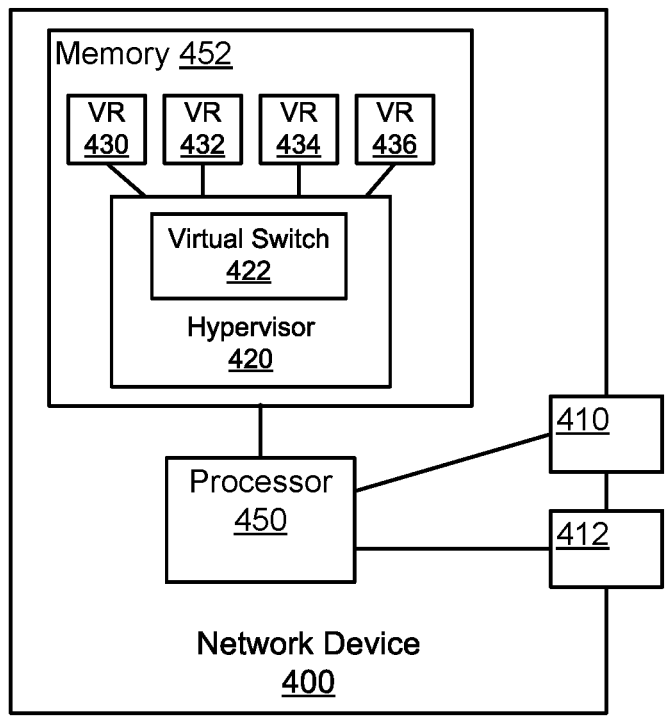
FIG. 4 is a system block diagram of the internal structure of a network device, according to an embodiment.

FIG. 4 is a system block diagram of the internal structure of a network device 400, according to an embodiment. Network device 400 can be structurally and functionally similar to network device 110, 120, 130 or 140 shown in FIG. 1. As shown in FIG. 4, network device 140 includes memory 452, processor 450 and ports 410, 412. Memory 452 includes virtual resource (VR) 430, 432, 434 and 436; and hypervisor 420, which includes virtual switch 422. In some embodiments, operations of network device 400, including receiving data packets or sending data packets via ports 410, 412, and manipulations on memory 452, can be controlled by processor 450.

Ports 410 and 412 can be part of communication interfaces and/or network interfaces (e.g., a 10 Gigabit (Gb) Ethernet interface, a 40 Gigabit (Gb) Ethernet interface, a 100 Gb Ethernet interface), through which network device 400 can send data packets to and/or receive data packets from other devices (e.g., a network device, a switch, an edge device, etc.). Although only ports 410 and 412 are shown in FIG. 4, network device 400 can include more than two ports coupled to other devices. The devices that communicate with network device 400 can be operatively coupled to one or more ports (e.g. port 410, 412) of network device 400 using any suitable connection such as, for example, an optical connection (e.g., an optical cable and optical connectors), an electrical connection (e.g., an electrical cable and electrical connectors), a wireless connection (e.g., a wireless link and wireless signal transceivers) and/or the like. Similarly stated, in some embodiments, port 410 or port 412 can implement a physical layer using twisted-pair electrical signaling via electrical cables, or fiber-optic signaling via fiber-optic cables, or wireless signaling via a wireless link between two wireless signal transceivers, etc.

Furthermore, the ports (e.g., ports 410, 412) of network device 400 can allow network device 400 to communicate with other devices that are coupled to network device 400, such as, for example, other network devices, switch modules, computer servers, via one or more communication protocols (e.g., an Ethernet protocol, a multi-protocol label switching (MPLS) protocol, a Fibre Channel protocol, a Fibre-Channel-over Ethernet protocol, an Infiniband-related protocol, etc.). In some embodiments, some ports implement one protocol such as Ethernet and some other ports implement a different protocol such as Fibre Channel. Thus, network device 400 can be in communication with multiple devices using homogeneous or heterogeneous physical layers and/or protocols via one or more ports (e.g., ports 410, 412).

In some embodiments, memory 452 can be, for example, a random-access memory (RAM) (e.g., a dynamic RAM, a static RAM), a flash memory, a removable memory, and/or so forth. Each virtual resources 430, 432, 434 or 436 included in memory 452 can be structurally and functionally similar to the virtual resources (e.g., virtual resource 122, 124, etc.) shown in FIG. 1. Specifically, virtual resource 430, 432, 434 or 436 can be, for example, a virtual machine or an application stored and running on a portion of memory 452 and executed by processor 450. Particularly, virtual resource 430, 432, 434 or 436 can be configured to define a data packet, such as data packet 200 shown in FIG. 2, which is destined to another virtual resource hosted in another network device.

Hypervisor 420 can be a combination of a hardware module and/or software (stored and/or executing in a hardware) that allows multiple virtual resources (e.g., virtual resources 430, 432, 434 and 436) to run concurrently on network device 400. In some embodiments, hypervisor 420 can present to the virtual resources a virtual operating platform and manage the execution of the virtual resources. Thus, multiple virtual resources can share the virtualized hardware resources through hypervisor 420. In some embodiments, a hypervisor can be referred to as a virtual machine manager (VMM).

Virtual switch 422 can be a module in hypervisor 420 that can prepare data packets received from virtual resource 430, 432, 434 or 436 to be tunneled from network device 400 to a destination network device. Specifically, after a data packet (e.g., data packet 200 shown in FIG. 2) is defined at one of virtual resources 430, 432, 434 and 436, the data packet is sent from the source virtual resource to virtual switch 422 included in hypervisor 420. Information associated with a destination virtual resource for the data packet is included in a header portion of the data packet (e.g., virtual resource header 240 of data packet 200 shown in FIG. 2). In response to receiving the data packet, virtual switch 422 is configured to encapsulate the data packet to define an encapsulated data packet, which includes information associated with a destination network device that hosts the destination virtual resource, as well as other routing information, in a header portion of the encapsulated data packet. Details of such an encapsulated data packet are described with respect to FIGS. 5-6. Based on the header portion of the encapsulated data packet, processor 450 is configured to send the encapsulated data packet out of network device 400 via one of the ports of network device 400 (e.g., port 410, port 412). Subsequently, the encapsulated data packet is tunneled to the destination network device via a data path across, for example, a network (e.g., network 170 shown in FIG. 1). Details of preparing and tunneling an encapsulated data packet are described with respect to FIGS. 7-8.

Figure 5:
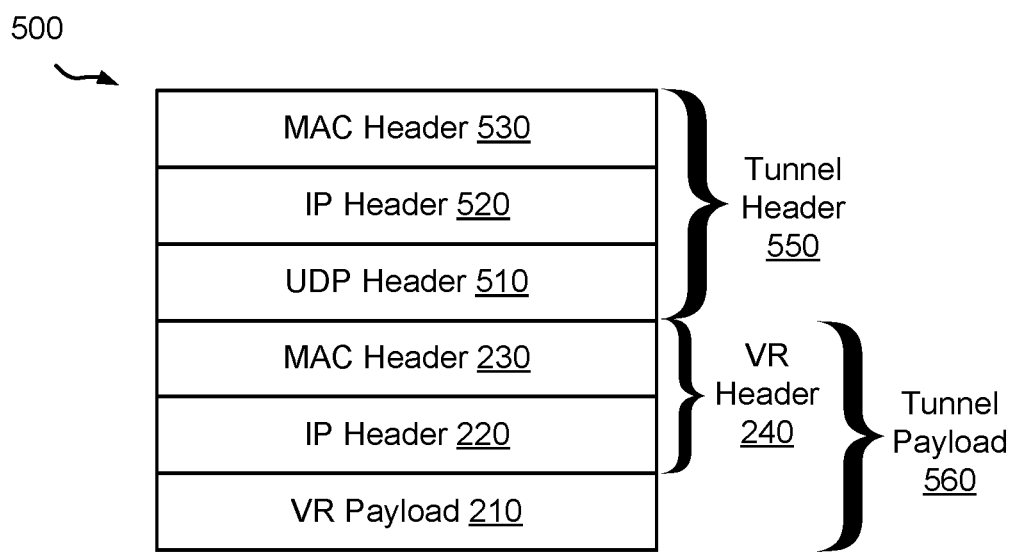
FIG. 5 is a schematic illustration of the structure of an encapsulated data packet defined at a virtual switch in a network device, according to an embodiment.

FIG. 5 is a schematic illustration of the structure of an encapsulated data packet 500 defined at a virtual switch in a network device, according to an embodiment. Similar to encapsulated data packet 300 shown in FIG. 3, encapsulated data packet 500 is also defined based on encapsulating data packet 200 shown in FIG. 2. Encapsulated data packet 500 can be defined at a virtual switch within a source network device including a source virtual resource, where data packet 200 is defined. For example, encapsulated data packet 500 can be defined at virtual switch 422 within network device 400 based on encapsulating data packet 200 that is defined at virtual resource 430 and sent from virtual resource 430 to virtual switch 422. Similar to encapsulated data packet 300 shown in FIG. 3, encapsulated data packet 500 can be defined to be destined to a destination network device hosting a destination virtual resource, to which data packet 200 is destined.

As shown in FIG. 5, encapsulated data packet 500 includes a tunnel payload 560, which essentially contains data packet 200; and a tunnel header 550, which includes MAC header 530, IP header 520 and UDP header 510. Tunnel payload 560 contains data packet 200 received from the source virtual resource where data packet 200 is defined, including virtual payload 210 and virtual header 240 (including MAC header 230 and IP header 220). Thus, tunnel payload 560 can be considered as the payload of encapsulated data packet 500. Tunnel header 550 includes information that can be used to route encapsulated data packet 500 from the source network device to the destination network device, for example, via a tunnel over a network (e.g., network 170 in FIG. 1). Particularly, tunnel header 550 contains two portions, as described in detail below.

The first portion of tunnel header 550 is associated with the destination network device and/or the source network device. As shown in FIG. 5, the first portion of tunnel header 550 can include MAC header 530 and IP header 520, which can be the same as MAC header 330 and IP header 320 included in encapsulated data packet 300 as shown in FIG. 3. In some embodiments, MAC header 530 and IP header 520 can contain a MAC address and an IP address of the destination network device, respectively. In some other embodiments, MAC header 530 and IP header 520 can, respectively, contain MAC addresses and IP addresses of both the destination network device and the source network device.

The second portion of tunnel header 550 is associated with a data flow for traffic sent from the source virtual resource to the destination virtual resource when encapsulated data packet 500 is tunneled from the source network device to the destination network device. In some embodiments, a data flow is referred to as the traffic originating between the same source and destination virtual resources. That is, the second portion of tunnel header 550 includes information associated with the source virtual resource and/or the destination virtual resource for encapsulated data packet 500 (or equivalently, data packet 200). In some embodiments, the second portion can be a transport protocol portion. For example, as shown in FIG. 5, the second portion can include a UDP header 510. Alternatively, the second portion can include a TCP (transmission control protocol) header portion (not shown in FIG. 5).

Note that the information associated with the source virtual resource or the destination virtual resource for data packet 200 is typically not included in the first portion of tunnel header 550, but only included in the second portion of tunnel header 550. As a result, data packets defined at different source virtual resources within a common source network device and/or destined to different destination virtual resources within a common destination network device typically have a common MAC header 530 and a common IP header 520, but different UDP headers 510.

For example, as shown in FIG. 1, a first data packet is defined, at virtual resource 112 in network device 110, to be destined to virtual resource 132 in network device 130. The first data packet is encapsulated at a virtual switch (not shown in FIG. 1) of network device 110 to define a first encapsulated data packet. A second data packet is defined, at virtual resource 114 in network device 110, to be destined to virtual resource 134 in network device 130. The second data packet is encapsulated at the virtual switch of network device 110 to define a second encapsulated data packet. As a result, the first and the second encapsulated data packets have the same MAC header 530 and IP header 520, but different UDP headers 510.

Figure 6:
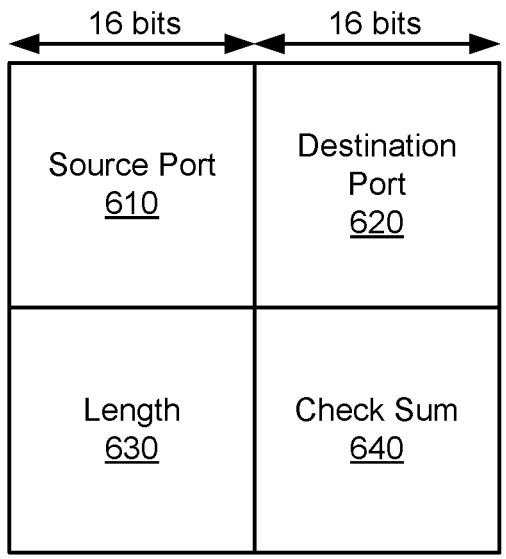
FIG. 6 is a schematic illustration of the structure of a UDP header defined for an encapsulated data packet at a virtual switch in a network device, according to an embodiment.

FIG. 6 is a schematic illustration of the structure of a UDP header 600 defined for an encapsulated data packet at a virtual switch in a network device, according to an embodiment. UDP header 600 can be similar to UDP header 510 shown in FIG. 5. That is, UDP header 600 can be defined for an encapsulated data packet similar to encapsulated data packet 500 at, for example, virtual switch 422 in network device 400, as shown in FIG. 4.

As shown in FIG. 6, UDP header 600 includes four fields: source port 610, destination port 620, length 630 and check sum 640, each of which is 16 bits (2 bytes). In some embodiments, the use of one or more of the four fields can be optional depending on the protocol applied in transmitting the encapsulated data packet. For example, the use of source port 610 and check sum 640 can be optional if Internet Protocol version 4 (IPv4) is applied in transmitting the encapsulated data packet. For another example, the use of source port 610 can be optional if Internet Protocol version 6 (IPv6) is applied in transmitting the encapsulated data packet.

In some embodiments, length 630 can include information associated with the length (e.g., in bytes) of the entire encapsulated data packet including the tunnel header portion and the tunnel payload portion. In some embodiments, check sum 640 can include a checksum value that is used for error-checking of the header (e.g., the tunnel header portion) and data (e.g., the tunnel payload portion) contained in the encapsulated data packet. In the example of FIG. 5, a length field in UDP header 510 can specify the length in bytes of the entire encapsulated data packet 500, including tunnel header 550 and tunnel payload 560 (i.e., data packet 200); a check sum field in UDP header 510 can include a checksum value that is used for error-checking of tunnel header 550 and tunnel payload 560.

Source port 610 and destination port 620 can include an identifier associated with the data flow for traffic sent from the source virtual resource to the destination virtual resource, which includes the encapsulated data packet. In some embodiments, the identifier can be unique to each unique pair of source virtual resource and destination virtual resource. In such embodiments, as described herein, encapsulated data packets associated with a unique pair of source virtual resource and destination virtual resource (i.e., originated at the source virtual resource and destined to the destination virtual resource) can have a common UDP header including a common identifier. As a result, those encapsulated data packets can be sent via a unique data path from the source network device to the destination network device. In some other embodiments, a set of multiple identifiers can be associated with each unique pair of source virtual resource and destination virtual resource. Each identifier included in the set of identifiers associated with each pair of source virtual resource and destination virtual resource is different from each identifier included in each remaining set of identifiers associated with each remaining pair of source virtual resource and destination virtual resource. In such embodiments, encapsulated data packets associated with a unique pair of source virtual resource and destination virtual resource (i.e., originated at the source virtual resource and destined to the destination virtual resource) can have different UDP headers including different identifiers. As a result, those encapsulated data packets can be sent via different data paths from the source network device to the destination network device.

In the example of FIG. 1, a data packet defined at virtual resource 112 in network device 110 and destined to virtual resource 132 in network device 130 is encapsulated at a virtual switch (not shown in FIG. 1) within network device 110 to define a first encapsulated data packet. As a result, an identifier is included in a source port field and a destination port field within a UDP header portion of the first encapsulated data packet. The identifier included in the UDP header portion of the first encapsulated data packet is associated with a first data flow for traffic sent from virtual resource 112 to virtual resource 132. Another data packet defined at virtual resource 116 in network device 110 and destined to virtual resource 136 in network device 130 is encapsulated at the virtual switch within network device 110 to define a second encapsulated data packet. As a result, another identifier is included in a source port field and a destination port field within a UDP header portion of the second encapsulated data packet. The identifier included in the UDP header portion of the second encapsulated data packet is associated with a second data flow for traffic sent from virtual resource 116 to virtual resource 136. Because the first data flow and the second data flow are different, the identifier included in the UDP header portion of the first encapsulated data packet is different from the identifier included in the UDP header portion of the second encapsulated data packet.

In some embodiments, the identifier associated with the data flow for the encapsulated data packet can be included in any portion of source port 610 and/or destination port 620, and dummy data can be inserted into the remaining portion of the two fields. For example, the identifier can be included in source port 610 only or in destination port 620 only. For another example, the identifier can be included in a portion of both source port 610 and destination port 620. In some embodiments, source port 610 can include a port number identifying a sender's port (i.e., a port associated with the source virtual resource in the source network device) for the data packet contained in the tunnel payload portion of the encapsulated data packet; and destination port 620 can include a port number identifying a receiver's port (i.e., a port associated with the destination virtual resource in the destination network device) for the data packet contained in the tunnel payload portion of the encapsulated data packet. In some embodiments, destination port 620 can include a well-known port number assigned to, for example, an application or a communication session associated with the data flow. Multiple such port numbers can be reserved to increase the length of the identifier from 16 bits (i.e., occupying source port 610 only) to potentially 32 bits (i.e., occupying both source port 610 and destination port 620).

In some embodiments, the identifier included in source port 610 and/or destination port 620 can be an output of a hash function using an address (e.g., IP address, MAC address) associated with the source virtual resource and/or an address (e.g., IP address, MAC address) associated with the destination virtual resource as inputs of the hash function. In the example of FIGS. 4-5, virtual resource 430 can be configured to define data packet 200, which is destined to a destination virtual resource (not shown in FIG. 4). Data packet 200 can then be sent to and encapsulated at virtual switch 422 to define encapsulated data packet 500. Specifically, an identifier associated with the data flow for traffic sent from virtual resource 430 to the destination virtual resource can be generated at virtual switch 422 and included in a source port field and a destination port field within UDP header 510 of encapsulated data packet 500. The identifier can be an output of a hash function that is executed at virtual switch 422, where addresses (e.g., IP address, MAC address) of virtual resource 430 (as the source virtual resource here) and/or the destination virtual resource included in virtual resource header 240 (e.g., IP header 220, MAC header 230) can be used as inputs of the hash function.

Returning to FIG. 5, UDP header 510 that is similar to UDP header 600 can be used to load balance encapsulated data packet 500 with respect to other encapsulated data packets sent from the same source network device to the same destination network device through a network (e.g., an IP network). Specifically, switching devices and networking devices within or coupled to the network can use tunnel header 550, especially UDP header 510, to route encapsulated data packet 500 to the destination network device, such that encapsulated data packet 500 is tunneled through the network via a data path different from the data path for another encapsulated data packet having a UDP header different than UDP header 510.

In the example of FIG. 4, virtual switch 422 can be configured to receive data packets (e.g., data packet 200) defined at virtual resource 430, 432, 434 or 436. Those data packets can be destined to one or more destination virtual resources hosted at one or more other destination network devices (not shown in FIG. 4). Virtual switch 422 can be configured to encapsulate each of those data packets to define an encapsulated data packet (e.g., encapsulated data packet 500) using a tunnel header (e.g., tunnel header 550), which includes a transport protocol portion such as a UDP header (e.g., UDP header 510) as shown and described with respect to FIG. 5. Each UDP header included in a tunnel header of an encapsulated data packet contains an identifier associated with a data flow for the original data packet (i.e., a data flow for traffic sent from virtual resource 430, 432, 434 or 436 to a destination virtual resource). In some embodiments, each data flow has a unique identifier or a unique set of identifiers. In some embodiments, each identifier for a data flow can be determined at virtual switch 422 based on the pair of a source virtual resource and a destination virtual resource associated with the data flow. For example, virtual switch 422 can be configured to determine an identifier for a data flow by retrieving information from a table that associates each pair of a source virtual resource and a destination virtual resource with a unique identifier or a unique set of identifiers. The table can be stored in a portion of memory 452 or any other portion of network device 400 that is accessible to virtual switch 422. For another example, virtual switch 422 can be configured to determine an identifier for a data flow using a hash function that receives the address (e.g., IP address, MAC address) of a source virtual resource and of a destination virtual resource as inputs. The output of the hash function can be used as the identifier for the data flow associated with the input pair of source virtual resource and destination virtual resource. As a result, the encapsulated data packets associated with different data flows can contain different identifiers in their UDP headers. Thus, those encapsulated data packets can have different tunnel headers.

Next, processor 450 can be configured to send the encapsulated data packets to the one or more destination network devices via one or more data paths based on the tunnel headers of the encapsulated data packets. Because the encapsulated data packets associated with different data flows have different tunnel headers, those encapsulated data packets are typically routed via different data paths from network device 400 to the destination network devices. Furthermore, even though some of the encapsulated data packets associated with different data flows are sent from network device 400 to a common destination network device, because the encapsulated data packets have different tunnel headers, the encapsulated data packets can be spread across multiple data paths instead of being sent via the same data path. Thus, load-balancing can be improved across the encapsulated data packets sent from network device 400.

Figure 7:
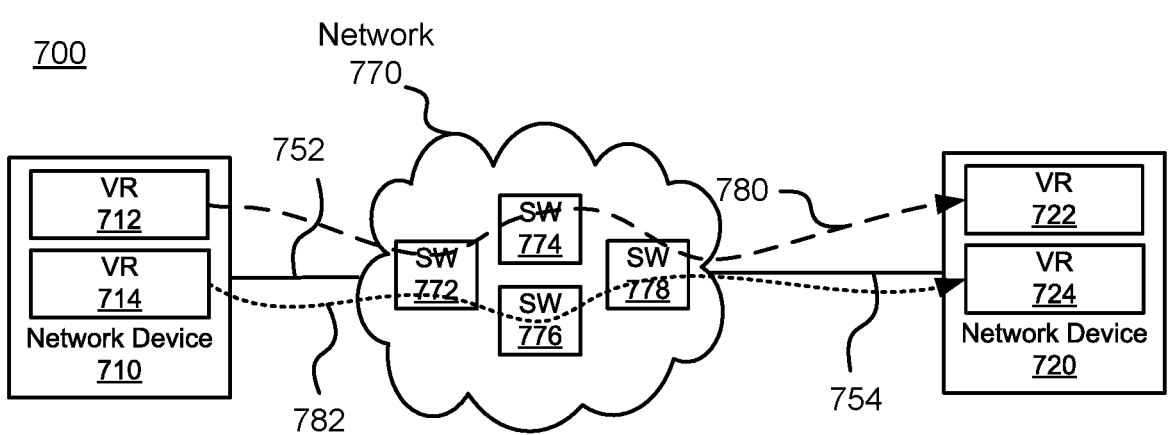
FIG. 7 is schematic illustration of network devices configured to transmit data packets via a network, according to an embodiment.

FIG. 7 is schematic illustration of network devices 710 and 720 configured to transmit data packets via a network 770, according to an embodiment. Network devices 710 and 720 can be structurally and functionally similar to network devices 110, 120, 130 and 140 shown in FIG. 1. As shown in FIG. 7, network device 710 includes virtual resources 712 and 714, and network device 720 includes virtual resources 722 and 724, where virtual resources 712, 714, 722 and 724 can be structurally and functionally similar to the virtual resources (e.g., virtual resource 122, 124, etc.) shown in FIG. 1. Furthermore, network device 710 is coupled to network 770 via link 752, and network device 720 is coupled to network 770 via link 754. Although not shown in FIG. 7, network device 710 or 720 can be coupled to network 770 via more than one link. Similar to network 170 shown in FIG. 1, network 770 can be any type of network that can connect multiple network devices (e.g., network devices 710, 720) and enable data transmissions among the connected network devices. Furthermore, as shown in FIG. 7, network 770 includes switch (SW) 772, 774, 776 and 778, which can be any type of switching (routing, bridging, etc.) device that can redirect data (e.g., data packets) as it flows through the switch.

In use, network devices 710 and 720 can be configured to transmit data packets to each other via portions of network 770. For example, as shown in FIG. 7, a first data packet can be sent from virtual resource 712 within network device 710 to virtual resource 722 within network device 720 via network 770. Similar to data packet 200 shown in FIG. 2, the first data packet can be defined, at virtual resource 712, to be destined to virtual resource 722. Addresses (e.g., IP address, MAC address) of virtual resource 722 and/or virtual resource 712 can be included in a header portion (e.g., IP header 220, MAC header 230) of the first data packet. Subsequently, the first data packet can be sent from virtual resource 712 to a virtual switch (e.g., virtual switch 422 shown in FIG. 4; not shown in FIG. 7) in network device 710, which can be configured to encapsulate the first data packet to define a first encapsulated data packet that is similar to encapsulated data packet 500 shown in FIG. 5. As described with respect to FIG. 5, the first data packet can be encapsulated using a tunnel header (e.g., tunnel header 550) that includes a UDP header (e.g., UDP header 510). The UDP header of the first encapsulated data packet contains an identifier associated with a data flow for the first data packet (i.e., a data flow for traffic sent from virtual resource 712 to virtual resource 722). In some embodiments, as described herein, the identifier associated with the data flow can be determined at the virtual switch of network device 710 as an output of a hash function using addresses (e.g., IP address, MAC address) of virtual resource 712 and/or virtual resource 722 as inputs of the hash function.

Next, network device 710 can be configured to send the first encapsulated data packet to network 770 via, for example, link 752. The first encapsulated data packet can then be further tunneled to network device 720 via a first data path (e.g., shown as path 780 in FIG. 7) through network 770. Specifically, the first encapsulated data packet can be switched at network device 710 or any switch within network 770 that receives the first encapsulated data packet based on the tunnel header of the first encapsulated data packet. For example, the UDP header and any other portion of the tunnel header of the first encapsulated data packet can be used as an input to a hash function (different from the hash function used to define the identifier for the first encapsulated data packet at the virtual switch in network device 710) at network device 710 or a switch on the first data path, such that the output of the hash function can be used to select one port from a set of ports in network device 710 or the switch on the first data path. Thus, the first encapsulated data packet can be sent out of network device 710 or the switch from the selected port, to reach the next-hop device (e.g., network device or switch) on the first data path. Such a selecting process can be operated at each device (e.g., network device or switch) on the first data path for the first encapsulated data packet, until the first encapsulated data packet is delivered to network device 720. As shown in FIG. 7, the first encapsulated data packet is sent within network 770 from switch 772 to switch 774, then to switch 778.

At network device 720, the first encapsulated data packet can be decapsulated by, for example, a virtual switch (e.g., virtual switch 422 shown in FIG. 4; not shown in FIG. 7) in network device 720, to retrieve the first data packet. Subsequently, the retrieved first data packet can be sent to virtual resource 722 within network device 720 based on the address (e.g., IP address, MAC address) of virtual resource 722 included in the header portion (e.g., IP header 220, MAC header 230) of the first data packet. Thus, the first data packet is sent from virtual resource 712 within network device 710 to virtual resource 722 within network device 720 via data path 780 across network 770.

For another example, as shown in FIG. 7, a second data packet can be sent from virtual resource 714 within network device 710 to virtual resource 724 within network device 720 via network 770. Similar to data packet 200 shown in FIG. 2 and the first data packet described above, the second data packet can be defined, at virtual resource 714, to be destined to virtual resource 724. Addresses (e.g., IP address, MAC address) of virtual resource 724 and/or virtual resource 714 can be included in a header portion (e.g., IP header 220, MAC header 230) of the second data packet. Subsequently, the second data packet can be sent from virtual resource 714 to the virtual switch in network device 710, which can be configured to encapsulate the second data packet to define a second encapsulated data packet that is similar to encapsulated data packet 500 shown in FIG. 5 and the first encapsulated data packet described above. As described with respect to FIG. 5, the second data packet can be encapsulated using a tunnel header (e.g., tunnel header 550) that includes a UDP header (e.g., UDP header 510). The UDP header of the second encapsulated data packet contains an identifier associated with a data flow for the second data packet (i.e., a data flow for traffic sent from virtual resource 714 to virtual resource 724). In some embodiments, similar to the identifier for the first encapsulated data packet, the identifier for the second encapsulated data packet can be determined at the virtual switch of network device 710 as an output of a hash function using addresses (e.g., IP address, MAC address) of virtual resource 714 and/or virtual resource 724 as inputs of the hash function. As a result, the identifier included in the UDP header of the second encapsulated data packet is typically different from the identifier included in the UDP header of the first encapsulated data packet.

Next, network device 710 can be configured to send the second encapsulated data packet to network 770 via, for example, link 752. The second encapsulated data packet can then be further tunneled to network device 720 via a second data path (e.g., shown as path 782 in FIG. 7) through network 770. Specifically, the second encapsulated data packet can be switched at network device 710 or any switch within network 770 that receives the second encapsulated data packet based on the tunnel header of the second encapsulated data packet. For example, the UDP header and any other portion of the tunnel header of the second encapsulated data packet can be used as an input to a hash function (different from the hash function used to define the identifier for the first encapsulated data packet or the identifier for the second encapsulated data packet at the virtual switch in network device 710) at network device 710 or a switch on the second data path, such that the output of the hash function can be used to select one port from a set of ports in network device 710 or the switch on the second data path. Thus, the second encapsulated data packet can be sent out of network device 710 or the switch from the selected port, to reach the next-hop device (e.g., network device or switch) on the second data path. Such a selecting process can be operated at each device (e.g., network device or switch) on the second data path for the second encapsulated data packet, until the second encapsulated data packet is delivered to network device 720. Furthermore, because the identifier in the UDP header for the second encapsulated data packet is different from the identifier in the UDP header for the first encapsulated data packet, the second data path is typically different from the first data path. As shown in FIG. 7, the second encapsulated data packet is sent within network 770 from switch 772 to switch 776, then to switch 778.

At network device 720, similar to the first encapsulated data packet, the second encapsulated data packet can be decapsulated by, for example, the virtual switch in network device 720, to retrieve the second data packet. Subsequently, the retrieved second data packet can be sent to virtual resource 724 within network device 720 based on the address (e.g., IP address, MAC address) of virtual resource 724 included in the header portion (e.g., IP header 220, MAC header 230) of the second data packet. Thus, the second data packet is sent from virtual resource 714 within network device 710 to virtual resource 724 within network device 720 via data path 782 across network 770.

Figure 8:
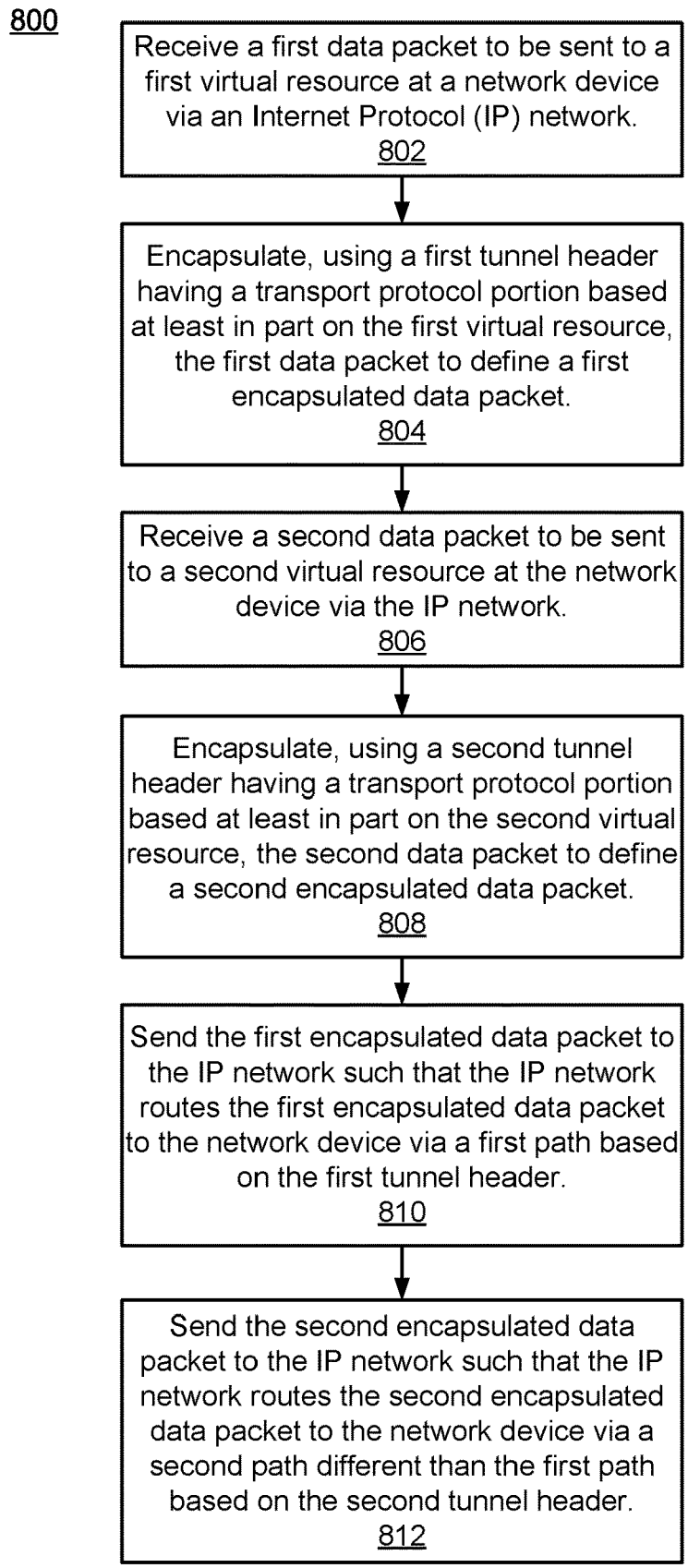
FIG. 8 is a flowchart of a method for preparing and sending data packets between virtual resources over an IP network, according to an embodiment.

FIG. 8 is a flowchart of a method for preparing and sending data packets between virtual resources over an IP network, according to an embodiment. The following operations described with respect to FIG. 8 can be performed within a source network device that includes a source virtual resource. Specifically, a non-transitory processor-readable medium can be a memory or stored in a memory within the source network device. The non-transitory processor-readable medium can have code representing instructions to be executed by a processor in the source network device, where the code can comprise code to cause the processor in the source network device to perform the following operations. In the example of FIG. 4, a non-transitory processor-readable medium stored in memory 452 can have code representing instructions to be executed by processor 450, where the code can cause processor 450 to prepare and send data packets out of network device 400, as described in detail with respect to steps 802-812.

At 802, a first data packet can be received at a virtual switch. The first data packet is to be sent to a first virtual resource at a (destination) network device via an IP network. The first data packet can be defined, at a first source virtual resource at a source network device hosting the virtual switch, to be destined to the first virtual resource at the destination network device. Specifically, IP addresses and/or MAC addresses of the first virtual resource and/or the first source virtual resource can be included in a virtual resource header portion (including a MAC header portion and an IP header portion) of the first data packet. The first data packet is then sent from the first source virtual resource to the virtual switch for further processing.

In the example of FIGS. 2 and 4-6, a first data packet similar to data packet 200 is defined, at virtual resource 430 of network device 400, to be destined to a first destination virtual resource at a destination network device (not shown in FIG. 4). Specifically, IP addresses and/or MAC addresses of the first destination virtual resource and/or virtual resource 430 are included in an IP header portion and a MAC header portion of the first data packet, which are similar to IP header 220 and MAC header 230 of data packet 200. The first data packet is then sent from virtual resource 430 to virtual switch 422 for further processing.

At 804, the first data packet can be encapsulated at the virtual switch, using a tunnel header having a transport protocol portion based at least in part on the first virtual resource, to define a first encapsulated data packet. In some embodiments, the transport protocol portion can be a UDP header that includes an identifier associated with a data flow for traffic sent from the first source virtual resource to the first virtual resource. In some embodiments, the virtual switch can be configured to define the identifier based on an output of a hash function using an IP address or a MAC address of the first virtual resource as an input to the hash function. Additionally, the virtual switch can also be configured to define a MAC header and an IP header in the tunnel header of the first encapsulated data packet, which contain MAC addresses and IP addresses of the destination network device and/or the source network device.

In the example of FIGS. 2 and 4-6, the first data packet is encapsulated at virtual switch 422 to define a first encapsulated data packet that is similar to encapsulated data packet 500. Specifically, virtual switch 422 is configured to encapsulate the first data packet using a tunnel header similar to tunnel header 550, which includes a UDP header similar to UDP header 510 or UDP header 600. The UDP header includes an identifier associated with a data flow for traffic sent from virtual resource 430 to the first destination virtual resource. In some embodiments, the identifier can be defined at virtual switch 422 based on an output of a hash function using an IP address or a MAC address of the first destination virtual resource as an input to the hash function. Additionally, virtual switch 422 is configured to define a MAC header and an IP header in the tunnel header of the first encapsulated data packet, which are similar to MAC header 530 and IP header 520. The MAC header and the IP header in the tunnel header of the first encapsulated data packet include MAC addresses and IP addresses of the destination network device and/or network device 400.

At 806, a second data packet can be received at the virtual switch. The second data packet is to be sent to a second virtual resource at the destination network device via the IP network. Similar to the first data packet, the second data packet can be defined, at a second source virtual resource at the source network device hosting the virtual switch, to be destined to the second virtual resource at the destination network device. Specifically, IP addresses and/or MAC addresses of the second virtual resource and/or the second source virtual resource can be included in a virtual resource header portion (including a MAC header portion and an IP header portion) of the second data packet. The second data packet is then sent from the second source virtual resource to the virtual switch for further processing.

In the example of FIGS. 2 and 4-6, a second data packet similar to the first data packet or data packet 200 is defined, at virtual resource 432 of network device 400, to be destined to a second destination virtual resource at the destination network device. Specifically, IP addresses and/or MAC addresses of the second destination virtual resource and/or virtual resource 432 are included in an IP header portion and a MAC header portion of the second data packet, which are similar to IP header 220 and MAC header 230 of data packet 200. The second data packet is then sent from virtual resource 432 to virtual switch 422 for further processing.

At 808, the second data packet can be encapsulated at the virtual switch, using a tunnel header having a transport protocol portion based at least in part on the second virtual resource, to define a second encapsulated data packet. In some embodiments, the transport protocol portion can be a UDP header that includes an identifier associated with a data flow for traffic sent from the second source virtual resource to the second virtual resource. In some embodiments, the virtual switch can be configured to define the identifier based on an output of a hash function using an IP address or a MAC address of the second virtual resource as an input to the hash function. As a result, the identifier defined for the second encapsulated data packet is typically different from the identifier defined for the first encapsulated data packet. Additionally, the virtual switch can also be configured to define a MAC header and an IP header in the tunnel header of the second encapsulated data packet, which contain MAC addresses and IP addresses of the destination network device and/or the source network device.

In the example of FIGS. 2 and 4-6, the second data packet is encapsulated at virtual switch 422 to define a second encapsulated data packet that is similar to the first encapsulated data packet or encapsulated data packet 500. Specifically, virtual switch 422 is configured to encapsulate the second data packet using a tunnel header similar to tunnel header 550, which includes a UDP header similar to UDP header 510 or UDP header 600. The UDP header includes an identifier associated with a data flow for traffic sent from virtual resource 432 to the second destination virtual resource. In some embodiments, the identifier can be defined at virtual switch 422 based on an output of a hash function using an IP address or a MAC address of the second destination virtual resource as an input to the hash function. As a result, the identifier defined for the second encapsulated data packet is typically different from the identifier defined for the first encapsulated data packet. Additionally, virtual switch 422 is configured to define a MAC header and an IP header in the tunnel header of the second encapsulated data packet, which are similar to MAC header 530 and IP header 520. The MAC header and the IP header in the tunnel header of the second encapsulated data packet include MAC addresses and IP addresses of the destination network device and/or network device 400.

At 810, the first encapsulated data packet can be sent to the IP network by the virtual switch, such that the IP network routes the first encapsulated data packet to the destination network device via a first path based on the tunnel header of the first encapsulated data packet. The source network device and each subsequent switching device on the first path that receives the first encapsulated data packet can determine a next-hop device to which to send the first encapsulated data packet based on its tunnel header. Specifically, the identifier included in the UDP header within the tunnel header and any other portion of the tunnel header of the first encapsulated data packet can be used as an input to a hash function (different from the hash function used to define an identifier for a data flow) at the source network device or a subsequent switching device on the first path, such that the output of the hash function can be used to select one port from a set of ports in the source network device or the switching device on the first path. As a result, the first encapsulated data packet can be sent out of the source network device or the switching device from the selected port, to a next-hop device, and ultimately to reach the destination network device via the first path.

In the example of FIGS. 2 and 4-6, network device 400 and each subsequent switching device that receives the first encapsulated data packet can determine a next-hop device to which to send the first encapsulated data packet, based on the tunnel header of the first encapsulated data packet. Specifically, the identifier included in the UDP header within the tunnel header and any other portion of the tunnel header of the first encapsulated data packet can be used as an input to a hash function (different from the hash function used to define an identifier for a data flow) at network device 400 or a subsequent switching device that receives the first encapsulated data packet, such that the output of the hash function can be used to select one port from a set of ports in network device 400 or the switching device. For example, port 410 of network device 400 can be selected to send the first encapsulated data packet. As a result, the first encapsulated data packet can be sent out of network device 400 or a subsequent switching device from the selected port, to ultimately reach the destination network device via a first data path.

At 812, the second encapsulated data packet can be sent to the IP network by the virtual switch, such that the IP network routes the second encapsulated data packet to the destination network device via a second path different than the first path based on the tunnel header of the second encapsulated data packet. Similar to the scenario of the first encapsulated data packet, the source network device and each subsequent switching device on the second path that receives the second encapsulated data packet can determine a next-hop device to which to send the second encapsulated data packet based on its tunnel header. Specifically, the identifier included in the UDP header within the tunnel header and any other portion of the tunnel header of the second encapsulated data packet can be used as an input to the hash function (different from the hash function used to define an identifier for a data flow) at the source network device or a subsequent switching device on the second path, such that the output of the hash function can be used to select one port from a set of ports in the source network device or the switching device on the second path. As a result, the second encapsulated data packet can be sent out of the source network device or the switching device from the selected port, to a next-hop device, and ultimately to reach the destination network device via the second path.

Furthermore, the identifier included in the first encapsulated data packet, which is associated with the data flow for traffic sent from the first source virtual resource to the first virtual resource, is typically different from the identifier included in the second encapsulated data packet, which is associated with the data flow for traffic sent from the second source virtual resource to the second virtual resource. Because the first path is determined based in part on the identifier included in the first encapsulated data packet, and the second path is determined based in part on the identifier included in the second encapsulated data packet, the first path is typically different than the second path.

In the example of FIGS. 2 and 4-6, network device 400 and each subsequent switching device that receives the second encapsulated data packet can determine a next-hop device to which to send the second encapsulated data packet, based on the tunnel header of the second encapsulated data packet. Specifically, the identifier included in the UDP header within the tunnel header and any other portion of the tunnel header of the second encapsulated data packet can be used as an input to the hash function (different from the hash function used to define an identifier for a data flow) at network device 400 or a subsequent switching device that receives the second encapsulated data packet, such that the output of the hash function can be used to select one port from a set of ports in network device 400 or the switching device. For example, port 412 of network device 400 can be selected to send the second encapsulated data packet. As a result, the second encapsulated data packet can be sent out of network device 400 or a subsequent switching device from the selected port, to ultimately reach the destination network device via a second data path.

Furthermore, the identifier included in the first encapsulated data packet, which is associated with the data flow for traffic sent from virtual resource 430 to the first destination virtual resource, is typically different from the identifier included in the second encapsulated data packet, which is associated with the data flow for traffic sent from virtual resource 432 to the second destination virtual resource. Because the first data path is determined based in part on the identifier included in the first encapsulated data packet, and the second data path is determined based in part on the identifier included in the second encapsulated data packet, the first data path is typically different than the second data path.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

While shown and described above with respect to FIGS. 2, 3 and 5 as a packet header (e.g., tunnel header 550) including both a MAC header portion (e.g., MAC header 530) and an IP header portion (e.g., IP header 520), in other embodiments, a packet header can include only one of a MAC header portion and an IP header portion. In such embodiments, an encapsulated data packet can be routed at a network device or a switching device based on only one of a MAC address and an IP address of a destination network device.

While shown and described above as a single data flow being defined between a source virtual resource and a destination virtual resource, in some embodiments, multiple data flows can be defined between a common source virtual resource and a destination virtual resource. In such embodiments, for example, one or more of a virtual resource transport protocol identifier (e.g., UDP or TCP), a virtual resource source port identifier, and/or a virtual resource destination port identifier can be used to define a data flow in addition to a source virtual resource IP address and a destination virtual resource IP address. Thus, for example, data packets having the same source virtual resource IP address, the same destination virtual resource IP address, the same virtual resource transport protocol identifier, the same virtual resource source port identifier, and the same virtual resource destination port identifier can be said to be within a common data flow. Accordingly, data packets sent between common source and destination virtual resources can be associated with different data flows if, for example, they have different virtual resource transport protocol identifiers, different virtual resource source port identifiers, and/or different virtual resource destination port identifiers. In such embodiments, a value associated with a second portion of the tunnel header (e.g., UDP header 510 of FIG. 5) can be an output of a hash function using at least one of a protocol identifier associated with the data packet, a source port identifier associated with the source virtual resource, or a destination port identifier associated with destination second virtual resource as an input of the hash function, in addition to the hash function using an IP address associated with the source virtual resource and an IP address associated with the destination virtual resource as inputs.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
 a processor; and
 a memory operatively coupled to the processor, the memory configured to host a virtual switch,
 the virtual switch configured to receive a data packet from a first virtual resource of a first set of virtual resources hosted at a first network device to be sent to a second virtual resource of a second set of virtual resources hosted at a second network device,
 the virtual switch configured to encapsulate the data packet to define an encapsulated data packet using a tunnel header including a first portion and a second portion, the first portion associated with the second network device, the second portion associated with a first data path from a plurality of data paths, the second portion having a source port identifier and a destination port identifier, the source port identifier and the destination port identifier including an output of a hash function using at least one of (1) an Internet Protocol (IP) address associated with the first virtual resource or (2) an IP address associated with the second virtual resource, as an input of the hash function, the output of the hash function identifying the first data path,
 the virtual switch configured to send, via the first data path and not via a second data path from the plurality of data paths, the encapsulated data packet to the second virtual resource to balance traffic load between the first network device and the second network device.

2. The apparatus of claim 1, wherein the tunnel header includes a Media Access Control (MAC) address and an IP address of the second network device.

3. The apparatus of claim 1, wherein the second portion is included in a User Datagram Protocol (UDP) header.

4. The apparatus of claim 1, wherein the hash function uses, as an input, at least one of (1) a Media Access Control (MAC) address associated with the first virtual resource or (2) a MAC address associated with the second virtual resource.

5. The apparatus of claim 1, wherein the hash function uses, as an input, a protocol identifier associated with the data packet.

6. The apparatus of claim 1, wherein:
 the data packet is a first data packet, the encapsulated data packet is a first encapsulated data packet, the tunnel header is a first tunnel header,
 the virtual switch configured to receive, from a third virtual resource from the first set of virtual resources hosted at the first network device, a second data packet to be sent to a fourth virtual resource from the second plurality of virtual resources hosted at the second network device,
 the virtual switch configured to encapsulate the second data packet to define a second encapsulated data packet using a second tunnel header having a third portion uniquely associated with the second data path between the third virtual resource and the fourth virtual resource,
 the virtual switch configured to balance the traffic load between the first network device and the second network device by sending the second encapsulated data packet to the second network device via the second data path, the first data path being different from the second data path.

7. The apparatus of claim 1, wherein:
 the second portion of the tunnel header includes a check sum value to check errors of (1) the tunnel header and (2) tunnel payload included in the encapsulated data packet.

8. The apparatus of claim 1, wherein:
 the second portion of the tunnel header is unique to each unique pair of source virtual resource and destination virtual resource included in the first set of virtual resources and the second set of virtual resources, respectively.

9. The apparatus of claim 1, wherein:
 the second portion of the tunnel header is not associated with a third data path that is (1) originated from the second virtual resource and (2) destined to the first virtual resource.

10. A method, comprising:
 receiving a data packet from a first virtual resource from a first set of virtual resources hosted at a first network device to be sent to a second virtual resource from a second set of virtual resources hosted at a second network device;
 encapsulating the data packet using a tunnel header to define an encapsulated data packet, the tunnel header having a first portion and a second portion, the first portion associated with the second network device, the second portion associated with a first data path from a plurality of data paths sent from the first network device to the second network device, the second portion having a source port identifier and a destination port identifier, the source port identifier and the destination port identifier including an output of a hash function and identifying the first data path; and
 sending, via the first data path and not via a second data path from the plurality of data paths, the encapsulated data packet to the second virtual resource to balance traffic load between the first network device and the second network device.

11. The method of claim 10, wherein the tunnel header includes a Media Access Control (MAC) address of the second network device and an IP address of the second network device.

12. The method of claim 10, wherein the tunnel header includes at least one of a User Datagram Protocol (UDP) portion or a Transport Control Protocol (TCP) portion.

13. The method of claim 10, wherein the second portion is included in a User Datagram Protocol (UDP) header.

14. The method of claim 10, further comprising:
 executing the hash function using at least one of (1) an Internet Protocol (IP) address associated with the first virtual resource or (2) an IP address associated with the second virtual resource, as an input of the hash function; and generating an output of the hash function identifying the first data path.

15. The method of claim 10, further comprising:

executing the hash function using, as an input, a protocol identifier associated with the data packet; and generating an output of the hash function identifying the first data path.

16. The method of claim 10, wherein:

the second portion of the tunnel header includes a check sum value to check errors of (1) the tunnel header and (2) tunnel payload included in the encapsulated data packet.

17. The method of claim 10, wherein:

the second portion of the tunnel header is unique to each unique pair of source virtual resource and destination virtual resource included in the first set of virtual resources and the second set of virtual resources, respectively.

18. The method of claim 10, wherein:

the second portion of the tunnel header is not associated with a third data path that is (1) originated from the second virtual resource and (2) destined to the first virtual resource.

19. A method, comprising:

receiving a first data packet from a first virtual resource from a first set of virtual resources hosted at a first network device to be sent to a second virtual resource from a second set of virtual resources hosted at a second network device;

receiving a second data packet from a third virtual resource from the first set of virtual resources to be sent to a fourth virtual resource from the second plurality of virtual resources;

encapsulating the first data packet using a first tunnel header to define a first encapsulated data packet, the first tunnel header having a first portion and a second portion, the first portion associated with the second network device, the second portion associated with a first data path from a plurality of data paths sent from the first network device to the second network device, the second portion having a source port identifier and a destination port identifier, the source port identifier and the destination port identifier including an output of a hash function and identifying the first data path;

encapsulating the second data packet to define a second encapsulated data packet using a second tunnel header having a third portion uniquely associated with a second data path from the plurality of data paths between the third virtual resource and the fourth virtual resource;

sending, via the first data path and not via the second data path, the first encapsulated data packet to the second virtual resource; and sending, via the second data path and not via the first data path, the second encapsulated data packet to the fourth virtual resource to balance traffic load between the first network device and the second network device.

20. The method of claim 19, wherein the second portion of the first tunnel header is included in a User Datagram Protocol (UDP) header.

\* \* \* \* \*